United States Patent
Heydron

(10) Patent No.: US 9,251,690 B2
(45) Date of Patent: **\*Feb. 2, 2016**

(54) REMOVABLE STAND ALONE VIBRATION MONITOR WITH AUTOMATICALLY CONFIGURED ALARM THRESHOLDS

(71) Applicant: Fluke Corporation, Everett, WA (US)

(72) Inventor: Paul H. Heydron, Everett, WA (US)

(73) Assignee: Fluke Corporation, Everett, WA (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/321,555

(22) Filed: Jul. 1, 2014

(65) Prior Publication Data
US 2014/0313043 A1 Oct. 23, 2014

Related U.S. Application Data

(63) Continuation of application No. 12/953,275, filed on Nov. 23, 2010, now Pat. No. 8,803,698.

(51) Int. Cl.
*G08B 21/00* (2006.01)
*G08B 21/18* (2006.01)
*G01H 1/00* (2006.01)
*G01M 13/02* (2006.01)

(52) U.S. Cl.
CPC .............. *G08B 21/187* (2013.01); *G01H 1/003* (2013.01); *G01M 13/028* (2013.01)

(58) Field of Classification Search
CPC ......... G01H 1/003; G01H 1/04; G01H 11/00; D06F 37/203; G05B 2219/37434; G05B 2219/37435
USPC ............. 340/683, 506, 679, 870.17; 700/280; 361/23
See application file for complete search history.

(56) References Cited

U.S. PATENT DOCUMENTS

| | | | |
|---|---|---|---|
| 4,237,454 A | 12/1980 | Meyer | |
| 5,602,757 A * | 2/1997 | Haseley et al. | 702/56 |
| 5,663,894 A * | 9/1997 | Seth et al. | 702/56 |
| 5,952,803 A | 9/1999 | Canada | |
| 5,963,884 A * | 10/1999 | Billington et al. | 702/56 |
| 6,192,325 B1 | 2/2001 | Piety | |
| 6,297,742 B1 * | 10/2001 | Canada et al. | 340/635 |
| 7,142,990 B2 * | 11/2006 | Bouse et al. | 702/35 |
| 7,561,200 B2 * | 7/2009 | Garvey et al. | 348/333.01 |
| 8,224,492 B2 * | 7/2012 | Lakomiak et al. | 700/280 |
| 8,478,548 B2 | 7/2013 | Hudson et al. | |
| 8,803,698 B1 | 8/2014 | Heydron | |
| 2001/0048370 A1 * | 12/2001 | Ostwald | 340/683 |
| 2003/0065482 A1 | 4/2003 | Bechhoefer | |
| 2008/0133439 A1 * | 6/2008 | Ikeda | 706/20 |
| 2008/0186194 A1 * | 8/2008 | Kaminski et al. | 340/683 |

(Continued)

*Primary Examiner* — Phung Nguyen
(74) *Attorney, Agent, or Firm* — Seed IP Law Group PLLC

(57) ABSTRACT

A user provides relevant information about the operating parameters of a machine to be monitored to a diagnostic instrument. The user also specifies a location of the machine to be monitored, an alarm level to be set, and the type of alert to be sent. The instrument then automatically generates appropriate an alarm threshold using a set of rules applied to the inputs. The instrument then transmits the alarm threshold to a removable stand-alone monitor. The stand-alone monitor acquires data about the machine, compares the date to the alarm threshold, and sends a user-specified alert when the alarm threshold has been reached. Using the diagnostic instrument and monitor, machines can be monitored for vibration, temperature, or a power parameter.

19 Claims, 3 Drawing Sheets

(56) References Cited

U.S. PATENT DOCUMENTS

2008/0234964 A1* 9/2008 Miyasaka et al. ............. 702/113
2009/0231153 A1* 9/2009 Hauenstein et al. .......... 340/683
2009/0292505 A1 11/2009 Van Dyke
2010/0102976 A1* 4/2010 Lee et al. ..................... 340/646
2011/0257900 A1 10/2011 Adams

* cited by examiner

REMOVABLE STAND ALONE VIBRATION MONITOR WITH AUTOMATICALLY CONFIGURED ALARM THRESHOLDS

CROSS-REFERENCE TO RELATED APPLICATION

This application is a continuation of U.S. patent application Ser. No. 12/953,275, filed Nov. 23, 2010, now U.S. Pat. No. 8,803,698, the disclosure of which is incorporated by reference herein in its entirety.

TECHNICAL FIELD

The present disclosure relates to a stand-alone removable monitor with an alarm system.

BACKGROUND

Vibrations occur in all types of rotating equipment, such as electric motors, fans, turbines, other machinery, or combinations thereof. The vibrations may be characteristic of regular operation of the equipment. However, machine conditions, such as unbalance, misalignment, bearing wear, looseness, and eccentric shafts, can cause vibrations that lead to or otherwise are indicative of impending equipment failure. Vibrations can be measured by using a sensor such as an accelerometer to measure vibration waveforms. In conjunction with accelerometers, vibration analyzers can be used to obtain frequency and amplitude information about the vibrations that are present. This information can be used to diagnose machinery faults prior to failure.

Typically, it is desirable for users to be alerted when problems with rotating machinery require attention to fix the problem, prior to failure of the system.

BRIEF DESCRIPTION OF THE DRAWINGS

Examples of a stand-alone, removable vibration monitor with alarm system are illustrated in the figures. The examples and figures are illustrative rather than limiting.

DETAILED DESCRIPTION

Figure 1:
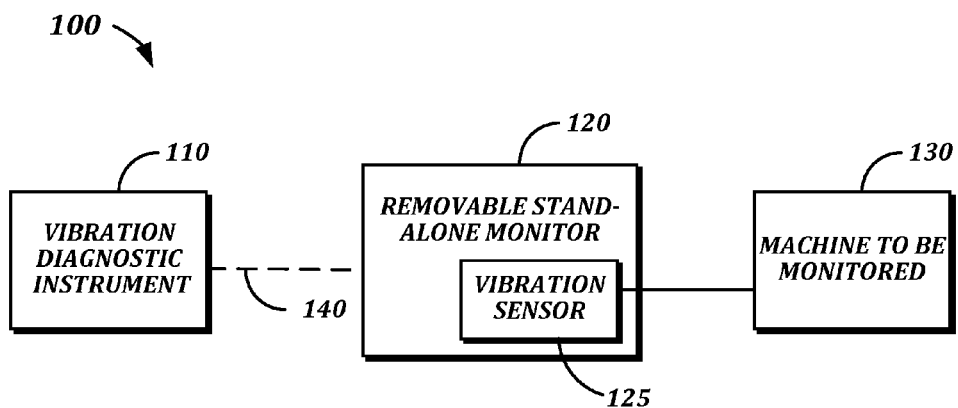
FIG. 1 shows a suitable set-up in which a stand-alone, removable vibration monitor with alarm system can be used.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Two techniques are generally known for monitoring machinery to determine when a problem arises. One is to install a permanent hard-wired vibration monitoring system, which can be quite expensive. Alternatively, machinery can be measured on a regular basis with a portable system to detect when a problem arises, but this may require time and personnel to repeatedly monitor the machinery to check for vibration problems.

Advantageously, a removable stand-alone monitor can be continuously monitored until a problem arises and an alarm threshold is reached. After the problem has been resolved, the removable stand-alone monitor can be re-deployed to monitor a different machine or even a different location on the same machine.

Vibration monitoring of machinery hinges upon the interpretation of the acquired vibration data and determination of a threshold beyond which the machine is considered to have developed a problem. Present monitoring methods for determining alarm thresholds, however, are inadequate.

One technique for interpreting acquired vibration data involves setting a simple threshold that is used with any machine to be analyzed. However, because there are differences in the normal operating state for different types of machines, this technique results in a large number of false negatives and false positives. Another technique for determining the alarm threshold involves collecting baseline data for a particular machine and then dynamically determining an alarm threshold based on the collected data. But there are two drawbacks to this method. First, baseline data of the machine must be taken while the machine is in proper working order. Second, a high level of technical expertise may be required to evaluate the data to create a valid alarm threshold.

As a solution to the methods currently available, a vibration diagnostic instrument can be used to create a "synthetic baseline" for a rotating machine. The synthetic baseline is generated based on an input of a description of the machine parameters in conjunction with rules stored in the instrument's memory. Upon acquiring vibration data from the machine, the vibration diagnostic instrument can indicate where there is a problem, and the problem can be classified by the instrument according to the severity of the problem (e.g., extreme, severe, moderate, or mild). Thus, the synthetic baseline allows a robust set of alarm thresholds to be generated. The synthetic baseline is discussed in greater detail in the following document and is incorporated by reference: U.S. patent application Ser. No. 12/688,736, entitled "User Interface System and Method for Diagnosing a Rotating Machine Condition Not Based upon Prior Measurement History," filed Jan. 15, 2010, and issued as U.S. Pat. No. 8,478,548 on Jul. 2, 2013.

In accordance with an exemplary embodiment to be described below, a removable stand-alone vibration monitor includes an alarm system for sending an alert when an automatically determined alarm threshold has been reached. The vibration diagnostic instrument can automatically determine suitable alarm thresholds using information input to the instrument about the machine to be monitored, such as the operational parameters of the machine. Thus, a user of the monitor does not have to determine and set the alarm thresholds. The stand-alone vibration monitor receives the alarm threshold from the vibration diagnostic instrument and takes vibration data at a particular location of the machine specified by the user. If the alarm threshold is reached, a suitable alert is transmitted.

FIG. 1 depicts a block diagram 100 of a suitable set-up in which a stand-alone, removable vibration monitor with alarm system 120 can be used to monitor a machine 130. The monitor 120 need not be a permanently installed hard-wired system. Rather, the monitor 120 can be used as a temporary monitor and can be readily moved to different locations. The monitor 120 has a vibration sensor 125. The vibration sensor 125 can be set up by a user to sense vibrations at one or more points of the machine to be monitored 130.

The vibration diagnostic instrument 110 is configured to receive user input as to the configuration and operational parameters of the machine to be monitored 130. In some embodiments, the instrument 110 includes a user interface to prompt a user for specific information about the machine. In this manner, the instrument can be readily operable by users without extensive training or experience in vibration data collection and analysis. Upon receiving and processing the requested information by user input, instrument 110 can determine one or more alarm thresholds. The alarm thresholds may correspond to different levels of severity of a problem (e.g., whether the vibration data indicate that a problem is extreme, severe, moderate, or mild). A different alarm threshold can be specified by the instrument 110 for different locations to be monitored on the machine 130.

The alarm thresholds determined by the instrument 110 can be downloaded to the stand-alone, removable monitor 120 through a connection 140. The transmission of the alarm thresholds to the monitor 120 can be through a direct wired connection, for example, through an electrical or optical cable. Alternatively, the transmission can take place through a wireless connection, for example, using radio frequency (RF) or infrared (IR) signals.

Figure 2:
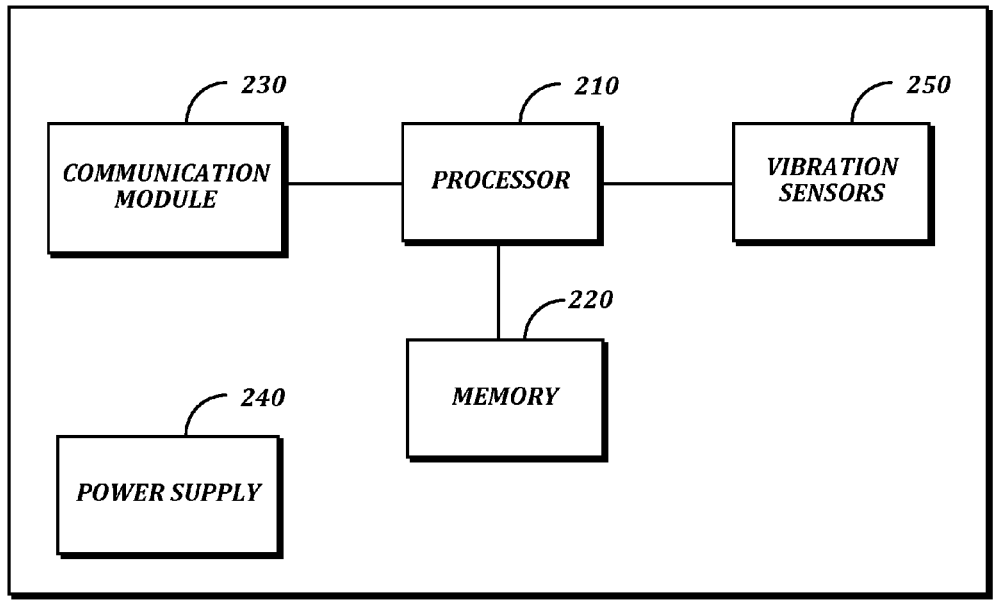
FIG. 2 shows a suitable block diagram of a stand-alone, removable vibration monitor with alarm system.

FIG. 2 shows a suitable block diagram 200 of a stand-alone, removable vibration monitor with alarm system. The stand-alone, removable vibration monitor includes a communication module 230, a processor 210, vibration sensors 250, a memory 220, and a power supply 240.

When the stand-alone, removable monitor 120 is installed, vibration sensors 250 can be configured to acquire data from the appropriate location or locations on the machine to be monitored 130. Non-limiting examples of vibration sensors 250 that can be used include accelerometers, velocity sensors, and displacement sensors.

The communication module 230 can include a receiver to receive the alarm thresholds determined by the vibration diagnostic instrument 110 and a transmitter to send alerts when an alarm threshold has been reached. The manner in which alerts are sent can be user-specified. Options for alert notifications may include, but are not limited to, flashing lights in the vicinity of the monitored machine, sending an email, a pager alert, or placing a call on a cell phone. In one embodiment, the communication module 230 can be an RFID radio that uses a wireless network, for example, to receive alarm thresholds from the instrument 110 and to transmit alerts to a cell phone or a pager.

The processor 210 processes the vibration data acquired by the vibration sensors 250. The processor 210 can comprise processing elements and/or logic circuitry configured to execute software code to compare the alarm thresholds to the vibration data to determine whether an alarm threshold has been reached.

The memory 220 can include, but is not limited to, RAM, ROM, and any combination of volatile and non-volatile memory. The memory 220 can store the alarm thresholds and the acquired vibration data.

A power supply 240 can include, but is not limited to, an electrical outlet or a battery.

Figure 3:
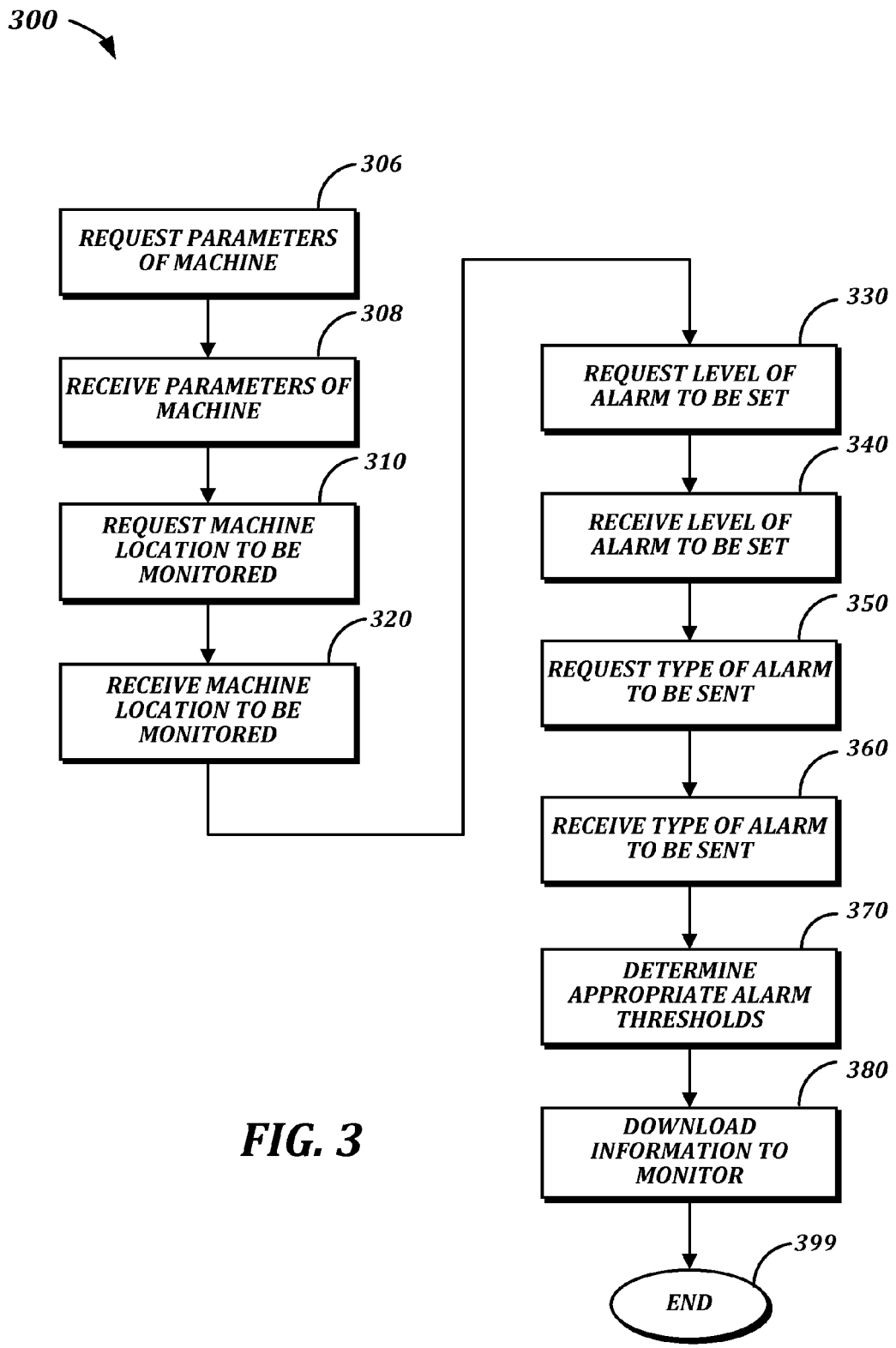
FIG. 3 depicts a flow diagram illustrating an example process of preparing the stand-alone removable vibration monitor for monitoring a machine.

FIG. 3 depicts a flow diagram illustrating an example process 300 of preparing the stand-alone removable vibration monitor for monitoring a machine.

At block 306, the vibration diagnostic instrument 110 requests information about the parameters of the machine, and at block 308, the vibration diagnostic instrument 110 receives the parameters. In one embodiment, the vibration diagnostic instrument 110 can prompt the user with a user-friendly interface based upon information received at block 304 to obtain the parameters of the machine.

At block 310, the vibration diagnostic instrument 110 requests information about the location on the machine to be monitored, and at block 320, the vibration diagnostic instrument 110 receives the monitoring location information from the user.

At block 330, the vibration diagnostic instrument 110 requests the level of alarm threshold to be set, for example, whether the alarm should be activated when the level of severity of a problem at the location to be monitored becomes a mild, moderate, severe, or extreme problem. Then at block 340, the vibration diagnostic instrument 110 receives the alarm level information from the user.

At block 350, the vibration diagnostic instrument 110 requests the type of alarm to be sent. Non-limiting examples of alarm types include flashing lights in the vicinity of the monitored machine, or sending an email, a pager alert, or a call to a telephone. Then at block 360, the vibration diagnostic instrument 110 receives the alarm type from the user.

At block 370, the vibration diagnostic instrument 110 creates robust alarm thresholds tailored to the specific machine to be monitored without the need for machine history or an expert user.

At block 380, the vibration diagnostic instrument 110 transmits the information received from the user at blocks 320, 340, and 360 above and the alarm thresholds determined at block 370 to the removable stand-alone monitor. The process ends at block 399.

Figure 4:
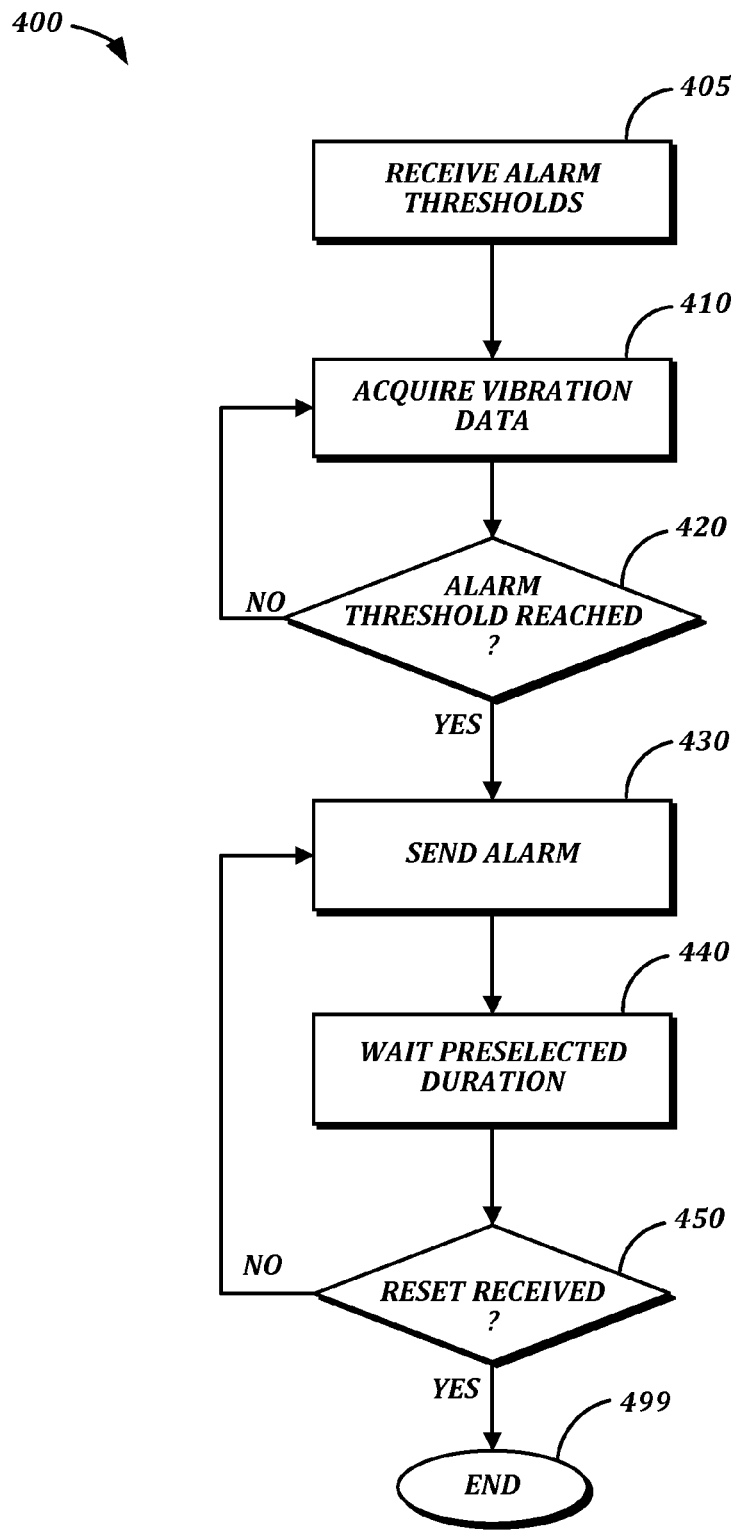
FIG. 4 depicts a flow diagram illustrating an example process of monitoring vibration data and sending an alarm when an alarm threshold has been reached.

FIG. 4 depicts a flow diagram illustrating an example process 400 of monitoring vibration data by the removable stand-alone monitor and sending an alarm when the alarm threshold has been reached.

At block 405, the stand-alone monitor receives the alarm thresholds from the vibration diagnostic instrument 110. At block 410, the stand-alone monitor acquires vibration data of the machine to be monitored using one or more vibration sensors that have been placed by the user at the location of the machine to be monitored.

At decision block 420, the stand-alone monitor determines whether the alarm threshold has been reached. If the alarm threshold has not been reached (block 420—No), the process returns to block 410 to continue acquiring data from the machine. If the alarm threshold has been reached (block 420—Yes), the process continues to block 430 where the system sends an alarm. In one embodiment, the stand-alone monitor can transmit vibration data to a user through email or fax.

At block 440, the stand-alone monitor waits a preselected amount of time. The duration of time that the stand-alone monitor waits can be set by the stand-alone monitor. Alternatively, the duration of time can be specified by the user. Then at decision block 450, the stand-alone monitor determines if a reset command has been received. If a reset command has not been received (block 450—No), the system returns to block 430 to send another alarm. If a reset command has been received (block 450—Yes), the process ends at block 499.

A removable stand-alone monitor that automatically configures alarm thresholds can be adapted to other complex data measuring situations. For example, a removable stand-alone monitor can be used to monitor power quality, such as whether the power generated at a power plant or transmitted over a power line is distortion-free without unwanted spikes and harmonics. A computer or a complex power quality instrument can be used to configure certain performance parameters of a power system, for example, three-phase delta, correction capacitor, and an alternating current (AC) motor, and identify where a monitor would be used to measure the performance of the power system. The computer or power quality instrument would then generate alarm conditions for one or more power system parameters including, but not limited to, phase balance, maximum harmonic content, and phase angle. These alarm conditions can then be downloaded to a simple removable stand-alone monitor.

In another example, a removable stand-alone monitor can be used to monitor thermal energy to determine appropriate operating temperature ranges of components. For example, a user can take a thermal image of an electrical cabinet that contains wiring, terminals, switches, and circuit breakers. Then the user can use a complex thermal imager or a computer to identify critical components to be monitored by selecting the part of the image showing the circuit breakers and identifying them as circuit breakers. The system would be pre-programmed with the proper operating temperature range for the circuit breakers and can automatically set an alarm threshold for when the breakers reach the point of overheating. A user can just identify the location of the components in the thermal image without needing to know the proper operating temperature limits for the circuit breaker. A system-generated alarm profile can then be downloaded to a removable stand-alone monitor. Other electrical components can also be monitored, for example, a condenser coil. Once the condenser coil is identified by the user, the system would automatically search for problems associated with a condenser, such as sharp temperature discontinuities, and set the alarm algorithms automatically for downloading to the removable stand-alone monitor.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention.

What is claimed is:

1. A monitor for monitoring a machine, comprising:
    a sensor;
    a memory configured to store an alarm threshold value, wherein the alarm threshold value is automatically configured from a set of rules applied to inputs characterizing machine operating parameters, machine location, and alarm parameters;
    a processor coupled to the memory and the sensor and configured to process data acquired by the sensor to determine if the alarm threshold value has been reached; and
    a communication module coupled to the processor and configured to receive the alarm threshold value from an instrument external to the monitor and to send an alert signal when the alarm threshold value has been reached.

2. The monitor of claim 1, wherein the sensor senses at least one of vibration, temperature, or a power parameter.

3. The monitor of claim 1, wherein the sensor senses at least one of phase balance, maximum harmonic content, or phase angle.

4. The monitor of claim 1, wherein the alarm parameters include a level of alarm threshold to be set and a type of alert signal to be sent.

5. The monitor of claim 1, wherein the alert signal includes at least one of flashing lights, placing a call to a phone, or sending a message over a wired or wireless network.

6. The monitor of claim 1, wherein the alarm threshold value is received wirelessly from the external instrument.

7. The monitor of claim 1, wherein the alarm threshold value is received through a wired connection from the external instrument.

8. The monitor of claim 1, wherein the external instrument determines the alarm threshold value without utilizing a baseline history of the machine.

9. The monitor of claim 1, wherein the memory stores the data acquired by the sensor, and the communication module sends the data with the alert signal when the alarm threshold value has been reached.

10. The monitor of claim 1, wherein the inputs include a location of a component to be monitored selected from a thermal image.

11. A system comprising:
a diagnostic instrument including a user interface configured to request and receive inputs characterizing operating parameters and alarm parameters of a machine, wherein the diagnostic instrument is configured to automatically determine an alarm threshold value from a set of rules applied to the inputs, and wherein the diagnostic instrument is configured to download the alarm threshold value to a monitor external to the diagnostic instrument; and
a monitor external to the diagnostic instrument and configured to receive the alarm threshold value for use by the monitor in determining whether the alarm threshold value has been met, wherein the monitor includes a sensor couplable to the machine at a first location, and wherein the monitor and the sensor are configured to be re-deployed to a location different from the first location.

12. The system of claim 11, wherein the monitor further includes:
a memory configured to store the alarm threshold value;
a processor coupled to the memory and the sensor and configured to process data acquired by the sensor to determine if the alarm threshold value has been reached; and
a communication module coupled to the processor and configured to receive the alarm threshold value from the diagnostic instrument and to send an alert signal when the alarm threshold value has been reached.

13. The system of claim 11, wherein the diagnostic instrument further comprises a transmitter for wirelessly downloading the alarm threshold value to the monitor.

14. The system of claim 13, wherein the transmitter transmits RF or IR signals.

15. The system of claim 11, wherein the diagnostic instrument further comprises a wired connection for downloading the alarm threshold value to the monitor.

16. The system of claim 15, wherein the wired connection is an optical cable.

17. The system of claim 11, wherein the diagnostic instrument is configured to determine the alarm threshold value without utilizing a baseline history of the machine.

18. The system of claim 11, wherein the diagnostic instrument is configured to determine an alarm threshold value related to at least one of vibration, temperature, or power quality.

19. The system of claim 11, wherein the inputs include a location of a component to be monitored selected from a thermal image.

* * * * *